2,902,384
NONFLOCCULATING METAL PHTHALOCYANINE PIGMENTS

Roland Otto Meyer, Holland, Mich., assignor to Chemetron Corporation, a corporation of Delaware No Drawing. Application March 27, 1956
Serial No. 574,094

14 Claims. (Cl. 106—288)

This invention relates to improved phthalocyanine pigment compositions and to methods of producing the same. More particularly, the invention relates to metal phthalocyanine pigments which are stabilized against flocculation by the addition of insoluble salts of metal phthalocyanine sulfonic acids.

Coloring matters of the phthalocyanine series are well known for their brilliance, tinctorial value and stability to light, heat and various chemicals. These coloring matters are useful in various kinds of coating compositions such as lacquers, paints, enamels, etc. Ideally such coloring matters, to be used for such purposes, must be thoroughly dispersed in the vehicle and remain dispersed on standing before use. However, there are practical difficulties involved in preparing such dispersions, particularly the difficulty known as "flocculation."

By "flocculation" is meant the tendency of the pigment particles to form aggregates which may settle out on standing and which are not easily re-dispersed. The result of flocculation is that coating compositions in deep tones containing such phthalocyanines usually become lighter and redder, while in pastel tones the tinctorial value is noticeably reduced. This is a disadvantage where white pigments such as zinc oxide or titanium dioxide are employed to dilute the metal phthalocyanine pigment since the weakening effect of flocculation on the tinctorial value of the latter is then particularly noticeable. In printing inks and lacquers, the weakening effect of flocculation is not as objectionable, since the copper phthalocyanine pigment as a rule is employed full strength in such mixtures.

Numerous suggestions have been made to overcome this tendency of metal phthalocyanine pigments to flocculate. For example, one method for controlling the flocculation of copper phthalocyanine in the vehicle contemplates the formation of an aluminum benzoate lake or compound pigment with the copper phthalocyanine. In this method aluminum benzoate is precipitated in the presence of the copper phthalocyanine in liquid or paste form, since purely physical mixtures of dry aluminum benzoate and dry copper phthalocyanine do not produce the nonflocculating effect. The quantity of aluminum benzoate so used is substantial, being at least 30% of the total pigment weight. The aluminum benzoate of this process forms the substratum of the lake or compound pigment and has no color value. It, therefore, acts to dilute or diminish the tinctorial strength of the copper phthalocyanine pigment. Accordingly, this process can only be employed where full color strength is not required.

Another method which has been suggested as a means for overcoming difficulty of flocculation of phthalocyanine pigments is that of mixing a phthalocyanine pigment with a phthalocyanine monosulfonic acid or its alkaline earth salts. For example, the Giambalvo Patent No. 2,526,345 teaches the use of phthalocyanine monosulfonic acid or its salts in preventing flocculation of phthalocyanine dyes, but warns against the use of polysulfonic acids. Specifically, the patent states that care must be taken that the sulfonation should not go beyond the monosulfonic acid; if any substantial amount of phthalocyanine disulfonic acid is present, marked water-sensitivity results, making the product undesirable for most coatings.

While the prior methods of inhibiting flocculation have been useful for certain purposes, they are far from a satisfactory solution of the problem. For instance, aluminum benzoate, as noted above, dilutes the color of the pigment to a serious degree. The use of phthalocyanine monosulfonic acid or its alkaline earth salts is practically ineffective as the sole antiflocculating agent in many pigment formulations. There has been a definite need for some time for a truly nonflocculating phthalocyanine pigment.

It is an object of this invention to prepare phthalocyanine pigments of improved physical properties, which will adapt them better for their various uses in the arts of making enamels, lacquers and paints. It is a further object of this invention to provide a method for controlling the physical properties of phthalocyanine pigments, especially as they relate to masstone, brightness, and tinctorial strength. It is a further, special object of this invention to prepare copper phthalocyanines, or other specific phthalocyanine compounds, in a nonflocculating form. Other and further useful objects of this invention will be apparent from the following disclosure.

The present invention is based upon the unexpected finding that a nonflocculating pigment composition may be produced from a combination of three components:

(1) A metal phthalocyanine pigment;
(2) An insoluble salt of a metal phthalocyanine sulfonic acid, which may be a monosulfonic acid or a polysulfonic acid or a mixture thereof;
(3) An aluminum salt of an organic aromatic acid.

A fourth component, an insoluble salt of a resin acid, is desirable but not essential. In such compositions flocculation is effectively retarded to a greater degree than has heretofore been attainable by use of other flocculation inhibitors. The degree of flocculation inhibition provided by the foregoing combination of antiflocculating agents is particularly impressive by reason of the fact that the individual antiflocculating agents, that is, the salt of a metal phthalocyanine sulfonic acid, the aluminum salt of an organic aromatic acid, and, optionally, an insoluble resinate, are ineffective in the specified concentrations. In other words, the combination is effective at concentrations where the individual components are ineffective. Further, the discovery that polysulfonic acids may be used in the pigment compositions is unexpected in view of the teaching of Giambalvo that phthalocyanine polysulfonic acids and salts are undesirable in nonflocculating phthalocyanine pigments.

In the foregoing composition, the amount of insoluble salt of phthalocyanine sulfonic acid is in the range of 5% to 25% by weight (dry basis) of the pigment composition. Such sulfonic acids and salts are known, as for example, in the Giambalvo Patent No. 2,526,345 and the Holzach and Niemann Patents No. 2,099,689 and No. 2,099,690. They are salts of metals such as calcium, strontium, barium, magnesium, aluminum, iron, cobalt, zinc, manganese, and nickel. The metal phthalocyanine pigments from which the sulfonic acids are derived include those of copper, tin, zinc, aluminum nickel, iron and cobalt.

Metal phthalocyanine sulfonic acids are soluble in water, and for this reason the acids are used in the form of their water insoluble salts. Conversion to such salts is conveniently accomplished during the step of mixing the metal phthalocyanine with the metal phthalocyanine sulfonic acid, by adding to the mixture a soluble salt of one of the metals recited above. The insoluble salts of metal phthalocyanine sulfonic acids precipitate during the mixing step and become intimately blended with the metal phthalocyanine pigment. The insoluble salts of the metal phthalocyanine sulfonic acids may also be incorporated into the mixture as such.

Another component of the antiflocculating pigment is an aluminum salt of an organic aromatic acid containing 7 to 10 carbon atoms. Included are aluminum salts of acids such as benzoic, toluic, chlorobenzoic and isobutylbenzoic. Such salts need only be added in relatively small amount, in the order of 10% by weight or less (dry basis), which is advantageous because they are not pigments and add nothing to the color of the complex.

Resinates such as are commonly used in pigment color compositions appear to magnify the antiflocculating effect of the metal phthalocyanine sulfonic acid salts and therefore may constitute a fourth component of the composition. These insoluble salts of resin acids may conveniently be produced by adding rosin or a solution of rosin in dilute alkali to the mixture containing metallic ions such as those of aluminum, calcium, barium or like metal. The resin acids which comprise the rosin form insoluble salts with the metals and precipitate in the pigment complex. They are present in the pigment to the extent of 1 to 5% by weight (dry basis).

While not necessary, it is preferable to disperse thoroughly a mixture of metal phthalocyanine and metal phthalocyanine sulfonic acid or its alkali salt in the presence of a suitable dispersing agent, before the other ingredients of the pigment composition are added.

There are several methods by which the resistance to flocculation of a pigment composition can be tested. The pigment composition as described in Example 1 may conceivably be incorporated in a lacquer, an enamel, or other coating composition in which it is compatible with the vehicle used. I prefer to make the tests in enamel coating compositions by mixing the blue paste obtained as in Example 1 with a white enamel so that a pastel blue shade is obtained. After thorough mixing, this blue enamel is sprayed on a prime coated metal panel and air dried at room temperature. After this the enamel is stored for about seven days at 120° Fahrenheit in a sealed glass container, and then sprayed again on a prime coated panel. After drying this second panel as before, the two panels are compared with each other to determine the effect of aging upon the enamel. A noticeable lightening of the shade of the panel made from the aged enamel indicates flocculation has occurred during aging.

The invention is disclosed in further detail in the following examples which are provided for the purpose of illustration and are not to be construed as limiting the invention in spirit or in scope. Relative amounts of materials are given in parts by weight. Throughout the specification and claims percentages are given on a dry weight basis and are calculated on the amount of solids present, water and organic solvents being omitted from the calculations.

*Example 1*

A pigment composition, possessing superior resistance to flocculation when used in coating composition, was prepared by mixing successively the following ingredients in a Baker-Perkins mixer or other suitable mixing equipment:

420 parts (dry weight) copper phthalocyanine blue presscake,
46.5 parts (dry weight) copper phthalocyanine disulfonic acid presscake,
9.25 parts of a sodium salt of a carboxylated polyelectrolyte dispersing agent such as Tamol 731 of Rohm & Haas Co.,
37.5 parts rosin, added in the form of its solution in aqueous alkali,
24.5 parts sodium benzoate,
50 parts hydrated aluminum sulfate,
15 parts barium chloride.

After all ingredients were added and thoroughly mixed, the mixture may be washed with water to remove soluble materials.

Such a pigment composition may be processed further, either by drying it and then grinding in a suitable vehicle, by direct incorporation in a vehicle by the process known as "flushing," or by converting it to a water-dispersible pigment suitable for aqueous coloring systems. It is an excellent nonflocculating pigment.

*Example 2*

A nonflocculating pigment composition without rosin is prepared as in Example 1, but using the following ingredients:

360 parts (dry weight) of copper phthalocyanine blue presscake,
40 parts (dry weight) of copper phthalocyanine disulfonic acid presscake,
9.0 parts of a sodium salt of a carboxylated polyelectrolyte dispersing agent such as Tamol 731 of Rohm & Haas Co., or other anionic surfactant,
58 parts of calcium chloride.

After thorough mixing of ingredients, the soluble materials were washed out with water and the pigment mixture was collected on a filter, dried and ground.

*Example 3*

A valuable nonflocculating pigment composition was prepared as in Example 1, but using 25 parts (dry weight) of copper phthalocyanine disulfonic acid presscake.

*Example 4*

A satisfactory nonflocculating pigment composition may be prepared as in Example 1, but using 50 parts (dry weight) of the sodium salt of copper phthalocyanine disulfonic acid presscake.

*Example 5*

A pigment composition prepared as in Example 1, but using 50 parts of rosin, forms an effective nonflocculating flushed color.

*Example 6*

A pigment composition, prepared exactly as in Example 1, was mixed in a Baker-Perkins mixer with 1217 parts of a 100% nonvolatile, oil modified, oxidizing type alkyd resin until the pigment was completely transferred to the oleo-resinous phase and the water removed, first by decantation and then by vacuum and heat. The mixture was then diluted with an aromatic petroleum solvent to a consistency suitable for use in coating materials, and a small quantity of phenolic antioxidant added. The flushed color thus produced was used in the production of high-gloss enamels. The composition of the flushed color was as follows:

| | Percent by weight |
|---|---|
| Phthalocyanine blue pigment | 16.3 |
| Aluminum resinate | 1.6 |
| Aluminum benzoate | 0.7 |
| Total pigment content | 18.6 |
| Alkyd resin | 42.7 |
| Solvent | 38.66 |
| Antioxidant | 0.04 |
| Total vehicle content | 81.40 |

*Example 7*

A pigment composition, prepared as in Example 6, but using only 1000 parts of the alkyd resin, was valuable in the production of enamels.

Example 8

A pigment composition, prepared as in Example 6, but using the same quantity of non-oxidizing alkyd resin, was found useful in the manufacture of lacquers, particularly of the nitrocellulose type.

Example 9

Phthalocyanine blue presscake (containing 105 parts of phthalocyanine blue on a dry basis) was added to a Baker-Perkins mixer and adjusted to pH 9.5 with ammonium hydroxide. Then a small amount of sodium alkylaryl sulfonate dispersing agent was added and the mixture agitated until smooth. The remainder of the presscake (315 parts dry basis) was added in small portions with sufficient ammonia water to maintain the pH at 9.5 and with small amounts of dispersing agent to keep the paste in a heavy, smooth mass. The mixture was mixed for one hour at room temperature with sufficient dispersing agent added to bring the total quantity to 9.25 parts. Then 46.5 parts of phthalocyanine disulfonic acid were slurried in about 50 parts of water and added slowly to the mixer. The mixture was agitated for about one-half hour and the pH adjusted to 9.5–9.8 with ammonia. About 5 parts of octyl alcohol were added as an antifoam agent. Steam was applied to the jacket of the mixer and the contents heated to 170° F., care being taken to prevent excessive foaming. The mixture was heated and stirred until foaming ceased. A solution of 38 parts of rosin in dilute aqueous alkali at 170° F. was added and the mixture agitated for ten minutes. Then 25.4 parts of sodium benzoate in 20% aqueous solution were added and the mixture again stirred for ten minutes, temperature throughout being maintained at 170° F. 50 parts of alum in the form of a 20% aqueous solution were added at 170° F. with agitation followed by a solution of 15 parts of barium chloride in the form of a 20% aqueous solution. The resulting mixture was maintained at 170° F. for one hour with good agitation.

Most of the pulp was removed from the mixer by tipping the latter and allowing it to drain. About 275 parts of a 100% nonvolatile, oil-modified, oxidizing-type alkyd resin were added and the resin-pulp mass max mixed until a break occurred. It was mixed for ten minutes longer and the water poured off. Resin and pulp were added in small portions with good agitation until a break occurred, at which time the water was drained and the procedure repeated. This was continued until a total of about 525 parts of alkyd resin was added and all of the pulp had been returned to the mixer. The mixer was stopped and 80 parts of alkyd resin and one part of sodium isopropylnaphthylenesulfonate were added. The mixer was started and run for about five minutes. Thereafter vacuum was applied and the mixer heated with steam to remove the remainder of the water, the temperature of the mixture being kept at about 95° to 100° F. Then about 700 parts of alkyd resin were added and the mixture heated under vacuum to a temperature of 150° F. The flushed pigment was thinned by adding an aromatic petroleum solvent dropwise until the paste became soft. Then the thinner was added at a faster rate to a consistency for use in enamel.

What is claimed as new and is desired to be secured by Letters Patent of the United States is:

1. A coloring composition comprising a metal phthalocyanine pigment, 5 to 25% of an insoluble salt of a metal phthalocyanine sulfonic acid, and 0.5 to 10% of an aluminum salt of an organic aromatic acid, containing 7 to 10 carbon atoms, the metal phthalocyanine pigment comprising substantially the balance of the coloring composition.

2. A coloring composition comprising copper phthalocyanine pigment, 5 to 25% of an insoluble salt of a copper phthalocyanine sulfonic acid, and 0.5 to 10% of an aluminum salt of an organic aromatic acid containing 7 to 10 carbon atoms, the copper phthalocyanine pigment comprising substantially the balance of the coloring composition.

3. A coloring composition comprising copper phthalocyanine pigment, 5 to 25% of a barium salt of a copper phthalocyanine sulfonic acid, and 0.5 to 10% of an aluminum salt of an organic aromatic acid containing 7 to 10 carbon atoms, the copper phthalocyanine pigment comprising substantially the balance of the coloring composition.

4. A coloring composition comprising copper phthalocyanine pigment, 5 to 25% of a calcium salt of a copper phthalocyanine sulfonic acid, and 0.5 to 10% of an aluminum salt of an organic aromatic acid containing 7 to 10 carbon atoms, the copper phthalocyanine pigment comprising substantially the balance of the coloring composition.

5. A coloring composition comprising a metal phthalocyanine pigment, 5 to 25% of an insoluble salt of a metal phthalocyanine polysulfonic acid, and 0.5 to 10% of an aluminum salt of an organic aromatic acid containing 7 to 10 carbon atoms, the metal phthalocyanine pigment comprising substantially the balance of the coloring composition.

6. A coloring composition comprising copper phthalocyanine pigment, 5 to 25% of an insoluble salt of a copper phthalocyanine polysulfonic acid, and 0.5 to 10% of an aluminum salt of an organic aromatic acid containing at least 7 to 10 carbon atoms, the copper phthalocyanine pigment comprising substantially the balance of the coloring composition.

7. A coloring composition comprising copper phthalocyanine pigment, 5 to 25% of a barium salt of a copper phthalocyanine polysulfonic acid, and 0.5 to 10% of an aluminum salt of an organic aromatic acid containing at least 7 to 10 carbon atoms, the copper phthalocyanine pigment comprising substantially the balance of the coloring composition.

8. A coloring composition comprising copper phthalocyanine pigment, 5 to 25% of a calcium salt of a copper phthalocyanine polysulfonic acid, and 0.5 to 10% of an aluminum salt of an organic aromatic acid containing at least 7 to 10 carbon atoms, the copper phthalocyanine pigment comprising substantially the balance of the coloring composition.

9. A coloring composition comprising copper phthalocyanine pigment, 5 to 25% of a barium salt of a copper phthalocyanine disulfonic acid, and 0.5 to 10% of aluminum benzoate, the copper phthalocyanine pigment comprising substantially the balance of the coloring composition.

10. A coloring composition comprising copper phthalocyanine pigment, 5 to 25% of a calcium salt of a copper phthalocyanine disulfonic acid, and 0.5 to 10% of aluminum benzoate, the copper phthalocyanine pigment comprising substantially the balance of the coloring composition.

11. A pigment composition comprising a metal phthalocyanine pigment, 5 to 25% by weight of an insoluble salt of a metal phthalocyanine polysulfonic acid, 0.5 to 10% by weight of aluminum benzoate and not more than 5% by weight of aluminum resinate, the metal phthalocyanine pigment comprising substantially the balance of the pigment composition.

12. A pigment composition comprising copper phthalocyanine pigment, 5 to 25% by weight of an insoluble salt of a copper phthalocyanine polysulfonic acid, 0.5 to 10% by weight of aluminum benzoate and not more than 5% by weight of aluminum resinate, the copper phthalocyanine pigment comprising substantially the balance of the pigment composition.

13. A pigment composition comprising copper phthalocyanine pigment, 5 to 25% by weight of a barium salt of a copper phthalocyanine polysulfonic acid, 0.5 to 10% by weight of aluminum benzoate and not more than 5% by weight of aluminum resinate, the copper phthalocyanine pigment comprising substantially the balance of the pigment composition.

14. A pigment composition comprising copper phthalocyanine pigment, 5 to 25% by weight of a calcium salt of a copper phthalocyanine polysulfonic acid, 0.5 to 10% by weight of aluminum benzoate and not more than 5% by weight of aluminum resinate, the copper phthalocyanine pigment comprising substantially the balance of the pigment composition.

References Cited in the file of this patent
UNITED STATES PATENTS

| | | |
|---|---|---|
| 2,099,689 | Holzach | Nov. 23, 1937 |
| 2,099,690 | Holzach | Nov. 23, 1937 |
| 2,238,243 | Black | Oct. 29, 1940 |
| 2,285,359 | Rosch | June 2, 1942 |
| 2,327,472 | Vesce | Aug. 24, 1943 |
| 2,526,345 | Giambalvo | Oct. 17, 1950 |